(12) United States Patent
Wilkinson et al.

(10) Patent No.: US 12,009,702 B2
(45) Date of Patent: Jun. 11, 2024

(54) PERMANENT MAGNET GENERATOR SYSTEMS

(71) Applicant: Hamilton Sundstrand Corporation, Charlotte, NC (US)

(72) Inventors: Andrew R. Wilkinson, Cherry Valley, IL (US); Dhaval S. Patel, Schaumburg, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/747,799

(22) Filed: May 18, 2022

(65) Prior Publication Data

US 2023/0421008 A1      Dec. 28, 2023

(51) Int. Cl.
*H02K 1/30*      (2006.01)
*H02K 1/278*    (2022.01)

(52) U.S. Cl.
CPC ............ *H02K 1/30* (2013.01); *H02K 1/278* (2013.01)

(58) Field of Classification Search
CPC .......... F03D 9/25; F03D 1/0658; F03D 15/20; F05B 2220/706; H02K 1/30; H02K 1/278
See application file for complete search history.

(56) References Cited

U.S. PATENT DOCUMENTS

| | | | |
|---|---|---|---|
| 6,455,975 B1 * | 9/2002 | Raad | H02K 7/125 310/51 |
| 6,555,941 B1 | 4/2003 | Zepp et al. | |
| 6,975,055 B2 * | 12/2005 | Joong | H02K 21/029 310/119 |
| 7,385,332 B2 | 6/2008 | Himmelmann et al. | |

FOREIGN PATENT DOCUMENTS

| | | | | |
|---|---|---|---|---|
| CN | 108964393 A | 12/2018 | | |
| DE | 2641815 A1 | 4/1978 | | |
| DE | 102015121406 A1 * | 8/2016 | ........... | H02K 1/2786 |
| EP | 0304974 A1 | 3/1989 | | |
| EP | 2197090 A1 | 6/2010 | | |
| WO | 2018196338 A1 | 11/2018 | | |

OTHER PUBLICATIONS

Translation of DE-102015121406-A1. Retrieved from https://worldwide.espacenet.com/patent/search/family/056410001/publication/DE102015121406A1?q=DE%20102015121406%20A1. Date 2023.*
Kang Chi Ho, et al., "Axial Unbalanced Magnetic Force in a Permanent Magnet Motor Due to a Skewed Magnet and Rotor Eccentricities", IEEE Transactions on Magnetics, vol. 53, No. 11, Nov. 2017, pp. 1-5.

(Continued)

*Primary Examiner* — Christopher M Koehler
*Assistant Examiner* — Riley Owen Stout (57) ABSTRACT

A permanent magnet generator (PMG) system can include a stator configured to output a voltage, and a rotor assembly configured to be magnetically coupled to the stator and to rotate relative to the stator to induce the voltage. The rotor assembly can be configured to passively attenuate the voltage output from the stator in response to acceleration of the rotor assembly at or above an impulse acceleration threshold.

20 Claims, 5 Drawing Sheets

(56) References Cited

OTHER PUBLICATIONS

Wang Jiabao et al., "Research on the Axial Force of Conical-Rotor Permanent Magnet Synchronous Motors with Turbines", Energies, vol. 11, No. 10, Oct. 22, 2018, p. 2532.
Anonymous et al., "How is the axial force of a three-phase AC motor formed?—Hannover", Retrieved from the Internet, Sep. 19, 2020, pp. 1-3.
Extended European Search Report dated Oct. 30, 2023, issued during the prosecution of European Patent Application No. EP 23173904.6.

* cited by examiner

PERMANENT MAGNET GENERATOR SYSTEMS

FIELD

This disclosure relates to permanent magnet generators.

BACKGROUND

A Permanent Magnet Generator (PMG) can include magnets attached tangentially to a rotor, in a salient configuration, such that the magnetic flux path emanates normal to the rotors tangent surface, which is concentrically encompassed within a coil wound stator. The voltage at the stator output can be the result of a prime mover turning the rotor at some given angular velocity. The velocity at which flux lines cross the coil windings, the number of turns over a length per coil, and the flux density are the fundamental components that determine voltage magnitude. Since the stator core, coils, and magnets are physically fixed, this means that the voltage is directly dependent on the rotational velocity. Aerospace alternating current (AC) electrical systems can be designed around a 400 Hz±10% topology, for example, which thus defines a speed operating range of the generator. The generator output voltage is desired to be stable regardless of varying loads throughout this speed range.

A generator control unit (GCU) can provide a switching topology to help attain this, using pulse width modulation (PWM). The switching implements a duty cycle that can be determined by a closed feedback loop. This can require that the PMG voltage capability be higher than the output voltage at the lowest end of the speed range as a minimum design point. There is also an over-voltage threshold that cannot be violated in the case that the load is abruptly removed from the system.

Traditionally, the combination of these operating requirements forces the design to a narrow operating point near current saturation, in order to guarantee the over-voltage compliance. This is narrow operating point tends to not be the optimal operating zone, regarding efficiency.

Such conventional methods and systems have generally been considered satisfactory for their intended purpose. However, there is still a need in the art for improved permanent magnet generator systems. The present disclosure provides a solution for this need.

SUMMARY

In accordance with at least one aspect of this disclosure, a permanent magnet generator (PMG) system can include a stator configured to output a voltage, and a rotor assembly configured to be magnetically coupled to the stator and to rotate relative to the stator to induce the voltage. The rotor assembly can be configured to passively attenuate the voltage output from the stator in response to acceleration of the rotor assembly at or above an impulse acceleration threshold.

The rotor assembly can include a shaft and a rotor having one or more permanent magnets disposed therein. The rotor can be slidably connected to the shaft to slide between a maximum coupling position where the rotor is magnetically coupled to the stator to cause the stator to output a maximum voltage, and a misaligned position where the rotor is at least partially decoupled from the stator to cause the stator to output less than the maximum voltage.

The rotor assembly can include a biasing member configured to bias the rotor to a maximum coupling position. The biasing member can be configured to hold the rotor in the maximum coupling position until the rotor accelerates at or above the impulse acceleration threshold. In certain embodiments, the biasing member can be a coil spring disposed coaxially around the shaft.

The rotor assembly can include one or more linear guides configured to rotationally fix the rotor to the shaft, and to allow the rotor to slide relative to the shaft. In certain embodiments, the one or more linear guides can extend from the shaft. The rotor can include one or more guide channels configured to receive the one or more linear guides.

The rotor assembly can include a backstop assembly configured to provide a back stop to the biasing member. In certain embodiments, the rotor can include a threaded end. In certain embodiments, the backstop assembly can include a lock nut configured to mesh to the threaded end of the shaft. The biasing member can be disposed between the lock nut and the rotor to bias the rotor.

The backstop assembly can include a tuning collar disposed between the lock nut and the biasing member to act as a backstop surface for the biasing member. The tuning collar includes one or more guide channels defined therein to receive the one or more linear guides.

In accordance with at least one aspect of this disclosure, a rotor assembly for a permanent magnet generator (PMG) can be configured to be magnetically coupled to a stator and to rotate relative to the stator to induce the voltage. The rotor assembly can be configured to passively attenuate the voltage output from the stator in response to acceleration of the rotor assembly at or above an impulse acceleration threshold. The rotor assembly can be or include any embodiment of a rotor assembly as disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
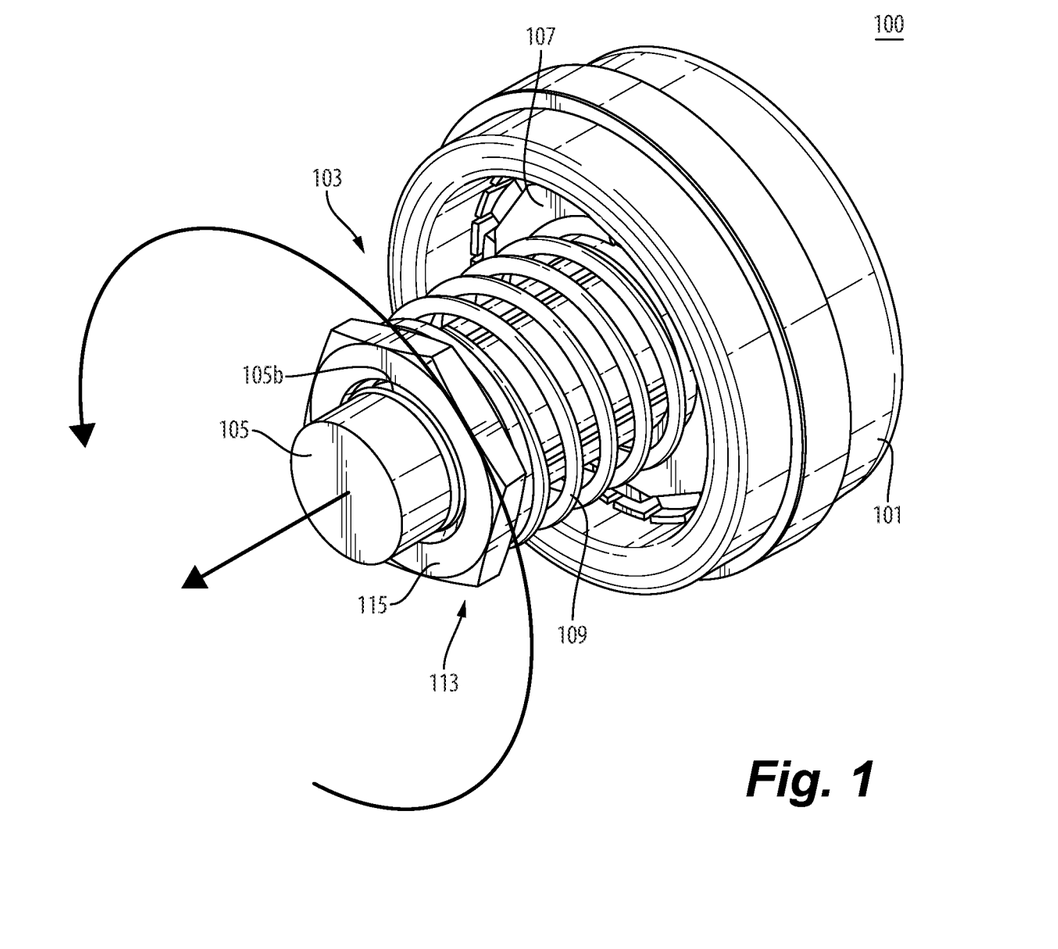
FIG. 1 is a perspective view of an embodiment of a system in accordance with this disclosure.
Figure 2:
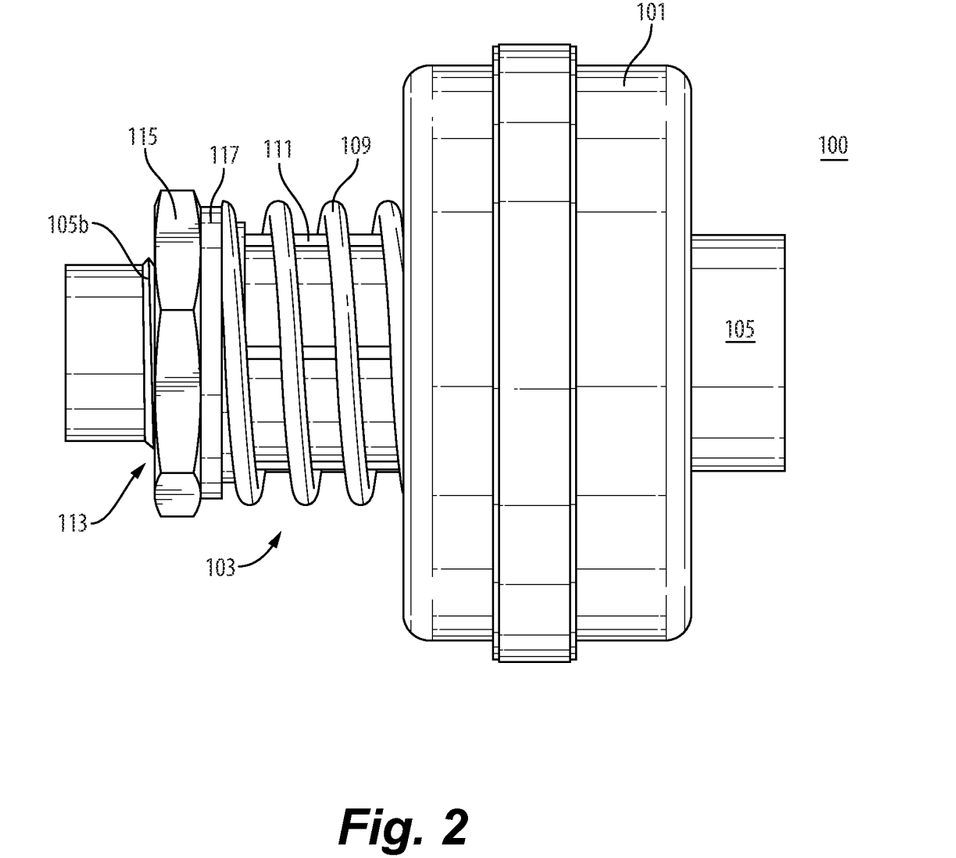
FIG. 2 is a side view of the embodiment of FIG. 1.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-5B. Certain embodiments described herein can be used to provide a more efficient generator that can be smaller and lighter while providing suitable overvoltage protection.

In accordance with at least one aspect of this disclosure, referring to FIGS. 1-4, a permanent magnet generator (PMG) system 100 can include a stator 101 configured to output a voltage, and a rotor assembly 103 configured to be magnetically coupled to the stator 101 and to rotate relative to the stator 101 to induce the voltage. The rotor assembly 103 can be configured to passively attenuate the voltage output from the stator 101 in response to acceleration of the rotor assembly 103 at or above an impulse acceleration threshold (e.g., a sufficiently high rotational acceleration of the rotor).

Figure 5A:
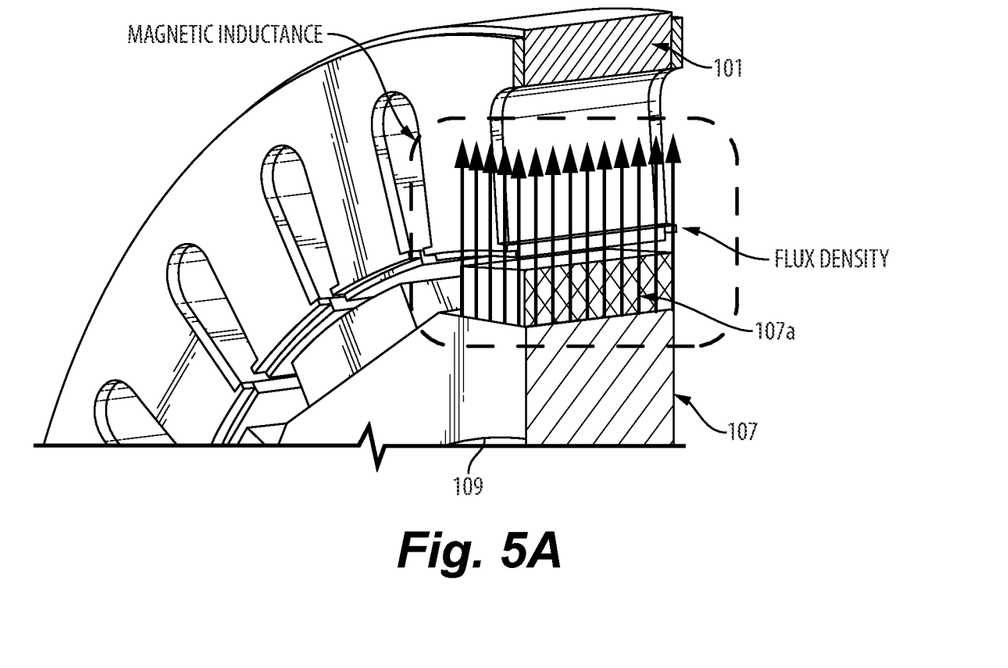
FIG. 5A is a schematic view illustrating the rotor of the system of FIG. 1 shown biased to an embodiment of a maximum coupling position in accordance with this disclosure.
Figure 5B:
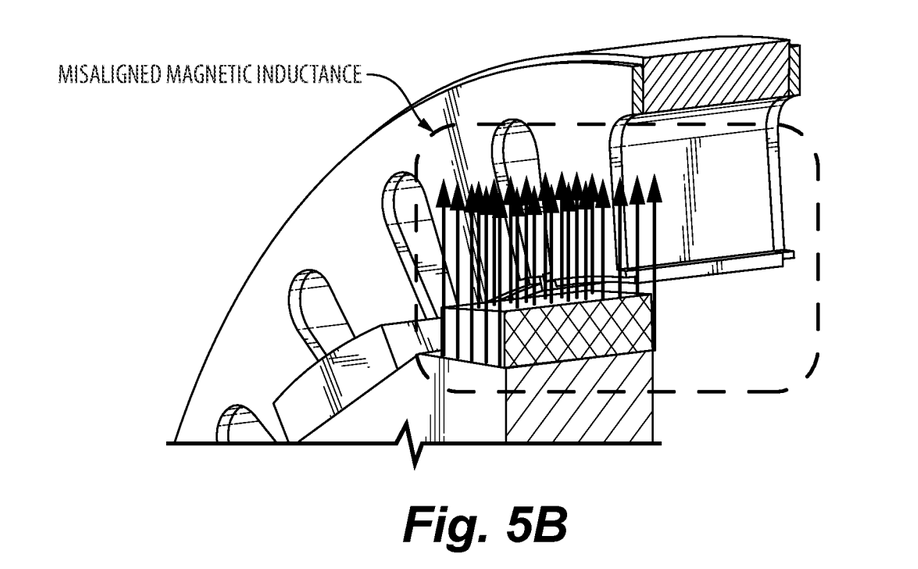
FIG. 5B is a schematic view of FIG. 5A, showing the rotor in a misaligned position in accordance with this disclosure.

The rotor assembly 103 can include a shaft 105 and a rotor 107 having one or more permanent magnets 107a disposed therein. The rotor 107 can be slidably connected to the shaft 105 to slide between a maximum coupling position (e.g., fully coupled as shown in FIG. 5A) where the rotor 107 is magnetically coupled to the stator 101 to cause the stator 101 to output a maximum voltage, and a misaligned position (e.g., as shown in FIG. 5B) where the rotor 107 is at least partially decoupled from the stator 101 to cause the stator 101 to output less than the maximum voltage (e.g., thereby preventing overvoltage).

The rotor assembly 103 can include a biasing member 109 configured to bias the rotor 107 to a maximum coupling position. The biasing member 109 can be configured to hold the rotor 107 in the maximum coupling position until the rotor 107 accelerates at or above the impulse acceleration threshold. In certain embodiments, the biasing member 109 can be a coil spring, e.g., as shown, disposed coaxially around the shaft 105. In certain embodiments, the biasing member 109 can be sized and/or shaped to provide a suitable spring force which can only be overcome by impulse acceleration of the rotor 107/shaft 105 that is at or above the impulse acceleration threshold. This can prevent the rotor 107 from moving out of the maximum coupling position in normal operational states and accelerations. An embodiment of a method for setting the spring force of an example biasing member is disclosed below.

Figure 4:
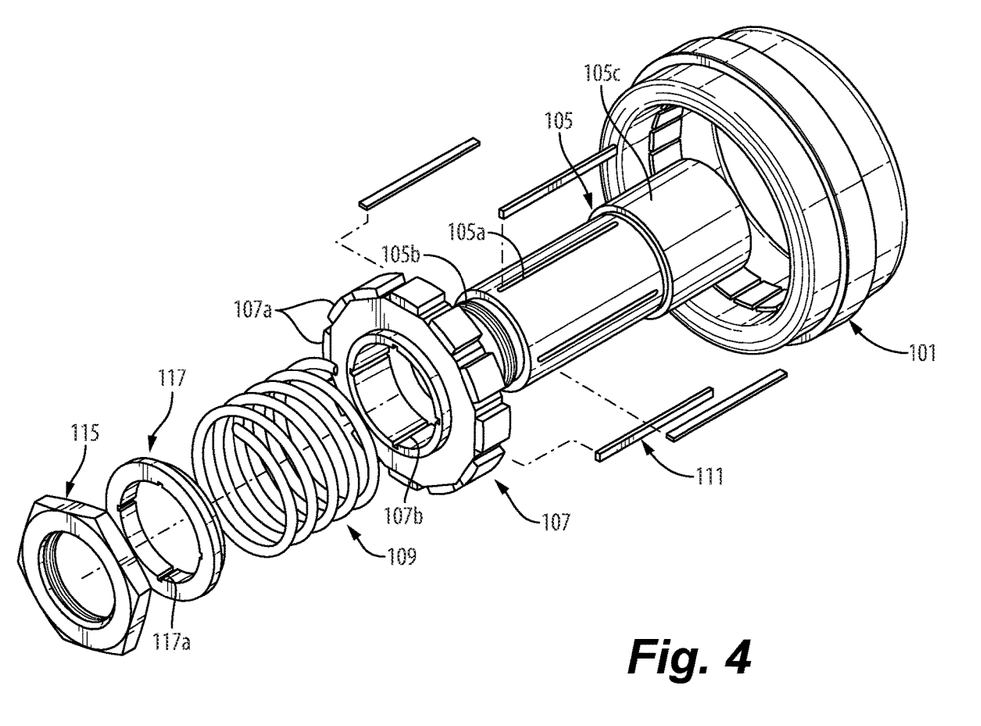
FIG. 4 is an exploded view of the embodiment of FIG. 1.

The rotor assembly 103 can include one or more linear guides 111 configured to rotationally fix the rotor 107 to the shaft 105, and to allow the rotor 105 to slide relative to the shaft 105. In certain embodiments, the one or more linear guides 111 can extend from the shaft 105 (e.g., disposed in a respective slot 105a defined in the shaft 105 as shown). The rotor 107 can include one or more guide channels 107b configured to receive the one or more linear guides 111 (e.g., as shown in FIG. 4). However, in certain embodiments, the one or more linear guides 111 can extend from the rotor 107 instead and be received by the shaft 105, for example. Any suitable arrangement is contemplated herein.

The rotor assembly 103 can include a backstop assembly 113 configured to provide a back stop to the biasing member 109. In certain embodiments, the rotor 105 can include a threaded end 105a, for example.

Figure 3:
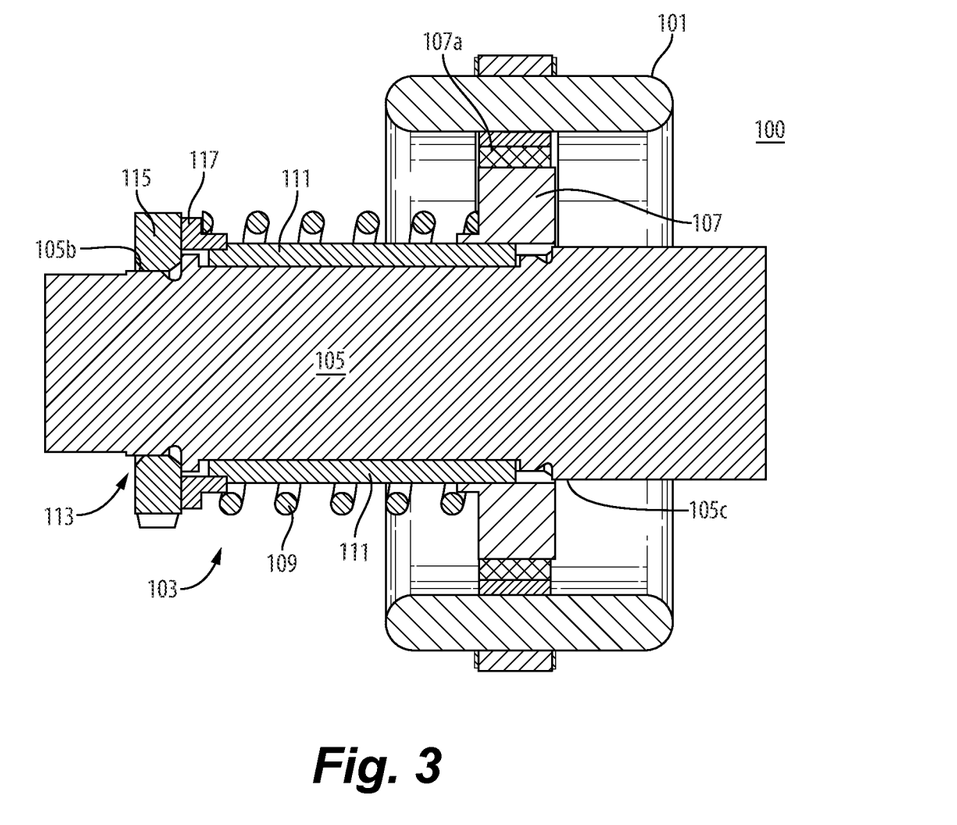
FIG. 3 is a cross-sectional view of the embodiment of FIG. 1.

In certain embodiments, the backstop assembly 113 can include a lock nut 115 configured to mesh to the threaded end 105b of the shaft 105. The biasing member 109 can be disposed between the lock nut 115 and the rotor 107 to bias the rotor 107, for example, e.g., as shown. In certain embodiments, the threaded end 105b can include a step down shape (e.g., the threads are on an outer surface of a smaller diameter than the remaining portion of the shaft 105) such that the lock nut 117 has an axial stopping point. The shaft 105 can also include a shoulder 105c at an opposite side of the shaft 105 relative to the threaded end 105b to abut the rotor 107 to provide a stopping point for the rotor 107 (e.g., as shown in FIG. 3).

The backstop assembly 113 can include a tuning collar 117 disposed between the lock nut 115 and the biasing member 109 to act as a backstop surface for the biasing member 109. In certain embodiments, the tuning collar 117 can include one or more guide channels 117a defined therein to receive the one or more linear guides 111.

In accordance with at least one aspect of this disclosure, a rotor assembly for a permanent magnet generator (PMG) can be configured to be magnetically coupled to a stator and to rotate relative to the stator to induce the voltage. The rotor assembly can be configured to passively attenuate the voltage output from the stator in response to acceleration of the rotor assembly at or above an impulse acceleration threshold. The rotor assembly can be or include any embodiment of a rotor assembly, e.g., assembly 103, as disclosed herein, e.g., as described above.

Certain embodiments only respond to impulse acceleration of a primer mover/engine, for example, and do so using only passive components. In such a system as shown, the resulting force due to acceleration of the shaft/rotor is an axial vector (right hand rule directionality as shown in FIG. 1). The biasing member can be configured relative to this vector such that the resultant force vector pushes against the biasing member to compress the biasing member to misalign rotor when sufficiently high force (due to acceleration above the impulse acceleration threshold) is generated. However, it is contemplated that any suitable biasing member arrangement that provides the same function (e.g., pulling against a spring on an opposite side of the rotor as shown) is contemplated herein.

Traditionally, PMG assemblies are used on all variable frequency generators (VFGs) in a mechanically fixed manner (e.g., press fit, lockout/shoulder). In many applications, it is a requirement that there cannot be an over-voltage event, e.g., due to reasons such as an abrupt disconnection of load, overspeed, etc. This is traditionally managed by the generator control unit to GCU to process the pulse width modulation (PWM) from the PMG to the exciter. However, this protection can fail due to processing delay or failure of the GCU, in which the over-voltage will still occur.

Certain embodiments can prevent overvoltage because the rotor can always passively misalign to reduce output voltage when acceleration exceeds the threshold. Such overvoltage issues can occur from a prime mover acceleration, or due to a sudden load drop off that the stator sees, for example. If load drops off, resistance on rotor reduces and the shaft can speed up suddenly. Embodiments can allow lowering of tolerances and can reduce the cost of building generator systems, for example.

FIG. 5A shows an example PMG fundamental anatomy freeze frame in angular motion (stator windings removed for clarity). FIG. 5B shows an example magnetic induction reduction due to misalignment (stator winding removed for clarity). Traditionally, if the over-voltage possibility did not exist, the PMG efficiency and robustness could be optimized, as a larger range of the operating curve could be utilized for the design. In order to remove the dependence of the over-voltage from the design, one of the fixed variables of the PMG can be made variable in response to the over-speed event (e.g., acceleration rate) in accordance with certain embodiments. Voltage in certain embodiments, e.g., as shown, is defined as follows:

$$\text{Volts}=v*B*l*N_T, \text{ where} \qquad \text{Eq. 1}$$

v: velocity (m/s$^2$)
B: flux density (T)
l: length of coil (m)
$N_T$: number of turns (const.)
m: meter
s: second
T: tesla As shown in FIG. 5B, embodiments allow the PMG rotor to physically misalign with the stator at a chosen specific acceleration from which can be selected as the over-speed mode in a particular application, and without disturbing the assembly locations of the rest of the machine.

Embodiments can consider the application rotation direction in which it can utilize the increasing acceleration's resultant torque (as shown in FIG. 1). This is accomplished through incorporating a tuned displacement attenuator (e.g., a biasing member) which opposes the subject torque opposite the tuning collar.

Embodiments can include linear guide polarization keys that can serve to lock the rotary position of the PMG rotor to the shaft and also allow the PMG rotor to transverse axially along the section defined with the degree of freedom. The linear guide polarization keys can be designed such that they are constantly contained by the tuning collar and the PMG rotor (e.g., The fixed shoulder on the shaft can locate the PMG rotor in its fundamental position that is aligned through the rotor bearings into the housing back to the fixed stator. The calculated gap between the two shaft shoulders, the tuning collar and the lock nut can encompass the passive response displacement attenuator such that it will load the PMG against its corresponding fixed shoulder on the shaft. In this configuration and any time when acceleration is zero, the effect of the attenuator is defined by Eq. 2. When acceleration exists and is increasing the angular velocity of the rotor in its normal direction, a torque vector appears as the cross-product of tangential force at an applied distance, and is defined by Eq. 3. Substituting Eq. 4 into Eq. 3, it can be seen that torque is a function of acceleration. A tuning equation can be developed by realizing that torque is (N m) which is equivalent to energy that can be represented by the units of Joules. It is valuable to note that the energy is being applied in a particular direction given by the cross product of Eq. 3. It is also valuable to note that embodiments of a passive response displacement attenuator not only applies a needed force to retain the PMG rotor but also stores potential energy in its compressed state given by Eq. 5 and is applied in the opposing direction of the torque energy created by acceleration. Equations 2-5 are shown below.

$$F=-x*k, \text{ where} \qquad \text{Eq. 2}$$

F: force (N)
x: distance (m)
k: spring constant (N/m)
N: newtons
m: meter $$\vec{\tau}=\vec{F}\times\vec{r}, \text{ where} \qquad \text{Eq. 3}$$

$\vec{\tau}$: torque (N·m)
$\vec{F}$: force (N)
$\vec{r}$: radial distance (m)
N: newtons
m: meter $$F=M*a, \text{ where} \qquad \text{Eq. 4}$$

F: force (N)
M: mass (kg)
a: acceleration (m/s$^2$)
s: second
m: meter
N: newton (kg·m/s$^2$)

$$PE=k*x^2, \text{ where} \qquad \text{Eq. 5}$$

PE: Potential Energy (J)
k: spring constant (N/m)
x: distance (m)
m: meter
N: newton (kg·m/s$^2$)
s: second
J: joules An embodiment of a tuning equation for providing a passive response PMG over-voltage attenuator is shown below as Eq. 6. This equation solves the misalignment factor designed around a specific acceleration impulse for a specific passive response displacement of the attenuator that drives the reduced equivalent (B) in Eq. 1 to a satisfactory voltage magnitude during over-speed.

$$x=\sqrt{\frac{(M*a*r)}{k}}, \qquad \text{Eq. 6}$$

where
x: PMG misalignment displacement (M)
k: spring constant (N/m)
M: equivalent rotational mass (kg)
r: radius of acting force (m)
N: newton (kg·m/s$^2$)
a: response to acceleration impulse (m/s$^2$)
m: meter
s: second In embodiments, the PMG no longer needs to be constrained to a narrow operating point on the design curve, allowing for improving design for manufacturability and assembly (DFMA), improving cost and lead times. Embodiments provide improved PMG operating efficiency. Using embodiments, the dedicated over-voltage control is independent of magnetic moment and stator manufacturing variability. Embodiments can be used to optimize efficiencies by incorporating variable voltage PMG response to acceleration transients and low over-voltage requirements.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A permanent magnet generator (PMG) system, comprising:
    a stator configured to output a voltage; and
    a rotor assembly configured to be magnetically coupled to the stator and to rotate relative to the stator to induce the voltage, wherein the rotor assembly is configured to passively attenuate the voltage output from the stator in response to acceleration of the rotor assembly at or above an impulse acceleration threshold, wherein the rotor assembly includes:
    a rotor having one or more permanent magnets disposed therein, wherein the rotor is configured to move between a maximum coupling position and a misaligned position where the rotor is at least partially decoupled from the stator to cause the stator to output less voltage than in the maximum coupling position; and
    a biasing member configured to bias the rotor to the maximum coupling position, wherein the biasing member is configured to hold the rotor in the maximum coupling position until the rotor accelerates at or above the impulse acceleration threshold.

2. The system of claim 1, wherein the rotor assembly includes:
    a shaft;
    wherein the rotor is slidably connected to the shaft to slide between the maximum coupling position where the rotor is magnetically coupled to the stator to cause the stator to output a maximum voltage, and the misaligned position where the rotor is at least partially decoupled from the stator to cause the stator to output less than the maximum voltage.

3. The system of claim 2, wherein the biasing member is a coil spring disposed coaxially around the shaft.

4. The system of claim 3, wherein the rotor assembly includes one or more linear guides configured to rotationally fix the rotor to the shaft, and to allow the rotor to slide relative to the shaft.

5. The system of claim 4, wherein the one or more linear guides extend from the shaft.

6. The system of claim 5, wherein the rotor includes one or more guide channels configured to receive the one or more linear guides.

7. The system of claim 6, wherein the rotor assembly includes a backstop assembly configured to provide a back stop to the biasing member.

8. The system of claim 7, wherein the rotor includes a threaded end.

9. The system of claim 8, wherein the backstop assembly includes a lock nut configured to mesh to the threaded end of the shaft, wherein the biasing member is disposed between the lock nut and the rotor to bias the rotor.

10. The system of claim 9, wherein the backstop assembly includes a tuning collar disposed between the lock nut and the biasing member to act as a backstop surface for the biasing member.

11. The system of claim 10, wherein the tuning collar includes one or more guide channels defined therein to receive the one or more linear guides.

12. A rotor assembly for a permanent magnet generator (PMG), wherein the rotor assembly is configured to be magnetically coupled to a stator and to rotate relative to the stator to induce a voltage output from the stator, wherein the rotor assembly is configured to passively attenuate the voltage output from the stator in response to acceleration of the rotor assembly at or above an impulse acceleration threshold, wherein the rotor assembly includes:
    a rotor having one or more permanent magnets disposed therein, wherein the rotor is configured to move between a maximum coupling position and a misaligned position where the rotor is at least partially decoupled from the stator to cause the stator to output less voltage than in the maximum coupling position; and
    a biasing member configured to bias the rotor to the maximum coupling position, wherein the biasing member is configured to hold the rotor in the maximum coupling position until the rotor accelerates at or above the impulse acceleration threshold.

13. The assembly of claim 12, further comprising:
    a shaft;
    wherein the rotor is slidably connected to the shaft to slide between the maximum coupling position where the rotor is magnetically coupled to the stator to cause the stator to output a maximum voltage, and the misaligned position where the rotor is at least partially decoupled from the stator to cause the stator to output less than the maximum voltage.

14. The assembly of claim 13, wherein the biasing member is a coil spring disposed coaxially around the shaft.

15. The assembly of claim 13, wherein the rotor assembly includes one or more linear guides configured to rotationally fix the rotor to the shaft, and to allow the rotor to slide relative to the shaft.

16. The assembly of claim 15, wherein the one or more linear guides extend from the shaft.

17. The assembly of claim 16, wherein the rotor includes one or more guide channels configured to receive the one or more linear guides.

18. The assembly of claim 17, wherein the rotor assembly includes a backstop assembly configured to provide a back stop to the biasing member.

19. The assembly of claim 18, wherein the rotor includes a threaded end.

20. The assembly of claim 19, wherein the backstop assembly includes a lock nut configured to mesh to the threaded end of the shaft, wherein the biasing member is disposed between the lock nut and the rotor to bias the rotor.

\* \* \* \* \*